United States Patent
Massow

(10) Patent No.: US 6,454,334 B2
(45) Date of Patent: Sep. 24, 2002

(54) GRIPPER DEVICE FOR THIN, PLATE-LIKE PARTS

(75) Inventor: Rainer Massow, Schloss Holte-Stukenbrock (DE)

(73) Assignee: Wilfried Strothmann GmbH & Co. KG, Maschinebau und Handhabungstechnik, Schloss Holte-Stukenbrock (DE)

( * ) Notice: Subject to any disclaimer, the term of this patent is extended or adjusted under 35 U.S.C. 154(b) by 0 days.

(21) Appl. No.: 09/898,412

(22) Filed: Jul. 3, 2001

(30) Foreign Application Priority Data

Jul. 5, 2000 (DE) .......................................... 100 32 754

(51) Int. Cl.⁷ .............................. B25J 15/06; B66C 1/02
(52) U.S. Cl. ........................................ 294/65; 294/81.2
(58) Field of Search ............................. 294/2, 64.1, 65, 294/67.33, 81.2, 81.54, 81.62, 119.1; 269/21, 104, 107, 109; 414/627, 737, 752.1, 783; 901/40

(56) References Cited

U.S. PATENT DOCUMENTS

| | | | | |
|---|---|---|---|---|
| 2,670,983 A | * | 3/1954 | Breslav | 294/67.33 X |
| 4,228,993 A | * | 10/1980 | Cathers | 294/65 X |
| 4,361,062 A | | 11/1982 | Reiff | |
| 4,732,376 A | * | 3/1988 | Umezawa | 294/65 X |
| 4,767,143 A | | 8/1988 | Michael et al. | |
| 5,387,068 A | * | 2/1995 | Pearson | 294/65 X |
| 5,988,718 A | * | 11/1999 | Sugimoto et al. | 294/65 |
| 6,145,901 A | * | 11/2000 | Rich | 294/64.1 |

* cited by examiner

Primary Examiner—Johnny D. Cherry
(74) Attorney, Agent, or Firm—Richard M. Goldberg

(57) ABSTRACT

A gripper device for thin, plate-like parts, especially sheet-metal parts, is provided with a plurality of suction cups (26,28,30,32) disposed on the underside of a carrier frame. The suction cups (26,28,30,32) are fixed to the outer ends of four gear racks (18,20,22,24) which are disposed as a cross and can be displaced longitudinally along two superimposed planes. In the center of the cross formed by the racks, mounted in a vertical axis, there is a toothed gear (46) which extends over both superimposed planes. The gear racks (18,20,22,24) engage with the toothed gear (46) in pairs from diametrically opposed sides. A control rod (72) with a gear rack profile engages with the toothed gear (46) on a third plane and has an engaging device (76) at one radially external end by means of which an adjusting force can be exerted on the control rod in order to displace it in the longitudinal direction.

15 Claims, 2 Drawing Sheets

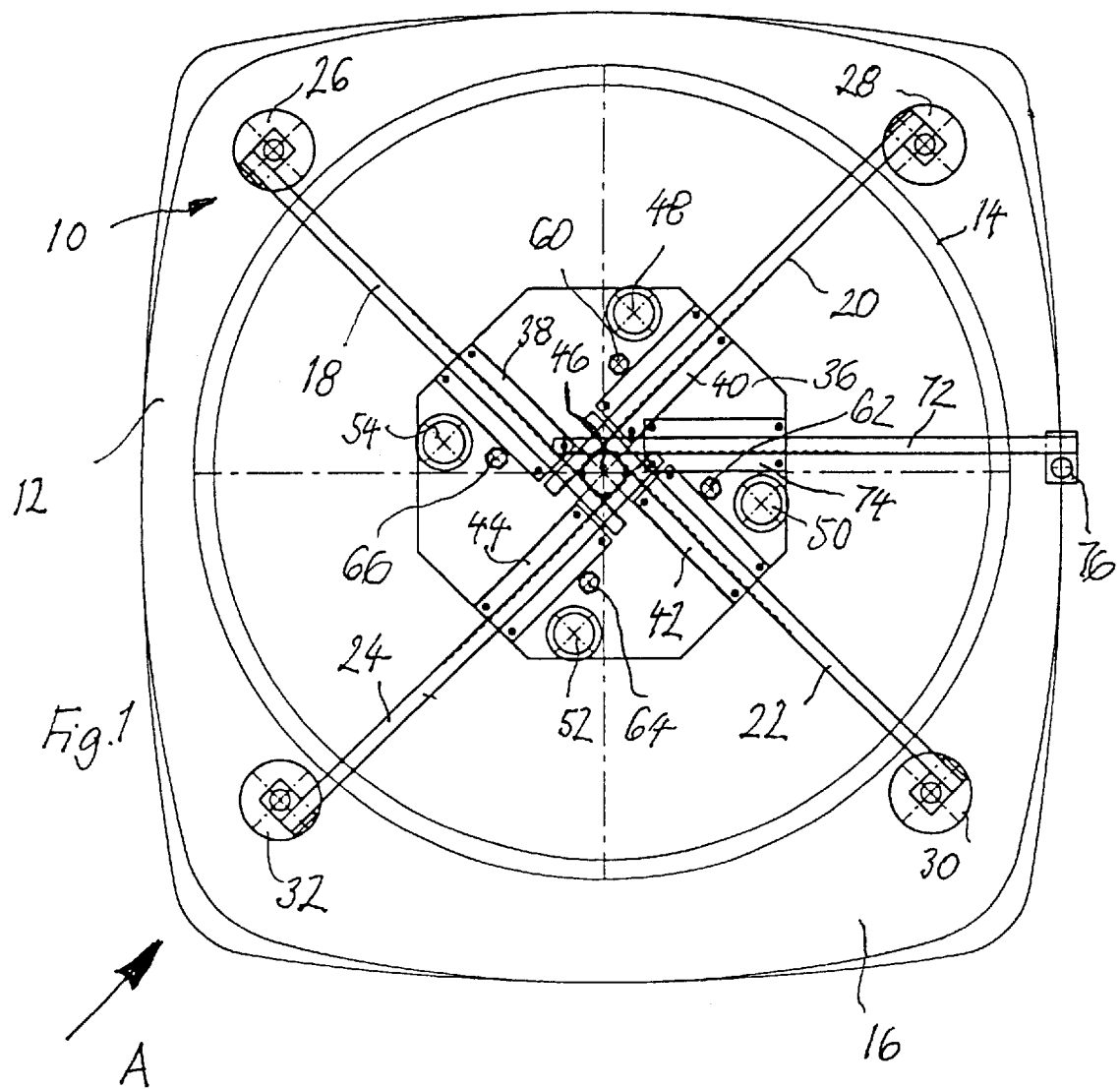
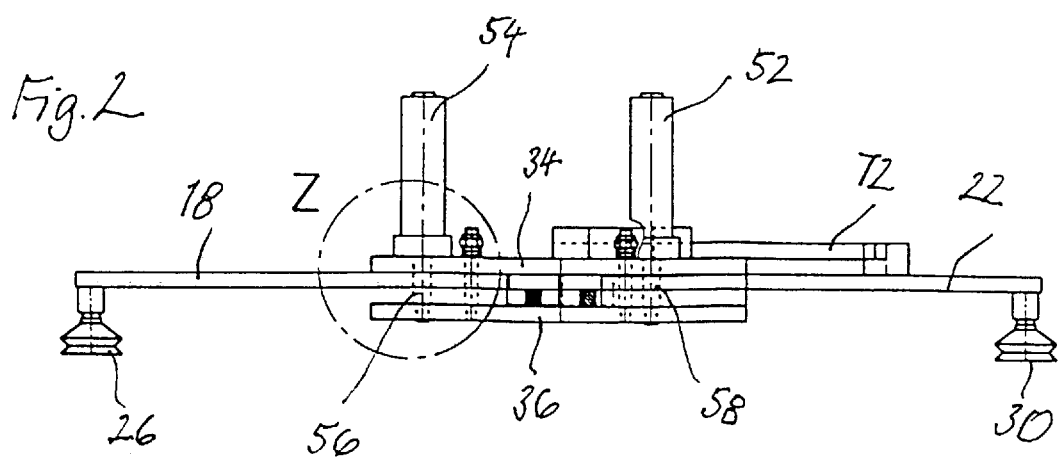

GRIPPER DEVICE FOR THIN, PLATE-LIKE PARTS

BACKGROUND OF THE INVENTION

This invention relates to a gripper device for thin, plate-like parts, especially sheet-metal parts, with a plurality of suction cups disposed on the underside of a carrier frame.

Gripper devices with suction cups are frequently used in industry to separate and/or change the position of thin, plate-like parts such as e.g. sheet-metal parts. They are particularly suitable for use in combination with robots when the aim is to achieve a largely automated method of working.

Where gripper devices of the said type are not intended to be used exclusively with one and the same plate-like part, the positions of the suction cups have to be adjustable to a certain degree. For this purpose the suction cups may be disposed on star or cross-shaped carrier frames with arms that can be adjusted, and, in particular, can be extended and retracted radially. It is necessary in particular to be able to make adjustments in order to take account of the bending characteristics of very thin plates, or to position the suction cups against the flat surfaces of three-dimensional parts.

Until now, the adjustment process has been mainly carried out by hand. When parts have to be changed frequently, however, this procedure is no longer feasible for economical reasons. To date, largely automatable solutions have comprised positioning motors with relatively precise position transducers and appropriate gears for adjusting the suction caps. These solutions were relatively complex and costly. They also tended to increase the weight of the carrier frame and were therefore also associated with disadvantages from the energy consumption point of view.

SUMMARY OF THE INVENTION

The invention is based on the task of equipping a gripper device of the above type, i.e. one which is used in conjunction with a robot, with a simple, cost-effective means of adjusting the suction cups.

According to the invention, this task is solved by a gripper device of the above type which is characterized in that the suction cups are fixed to the outer ends of four gear racks which are disposed as a cross and can be displaced longitudinally along two superimposed planes, in that in the centre of the cross formed by the racks, mounted in a vertical axis, there is a toothed gear which extends over both superimposed planes, in that the gear racks engage with the toothed gear in pairs from diametrically opposed sides, and in that a control rod with a gear rack profile engages with the toothed gear on a third plane, said control rod having an engaging device at one radially external end.

In a mechanism of this type, the gear racks are adjusted radially in that the engaging member is made to engage with a fixed point in the vicinity of the gripper device, and the gripper device is then moved horizontally by the associated robot in such a way that the control rod is displaced radially towards the exterior or the interior. When the control rod is displaced longitudinally the toothed gear rotates, and the rotation of the toothed gear extends or retracts the four gear racks.

The gear racks are preferably positioned between top and bottom clamping plates, between which they are displaced within longitudinal guides. Once the correct adjustment has been found for the gear racks, they can be clamped in position by clamping the clamping plates together. Air cylinders are provided for this purpose on top of the top clamping plate or underneath the bottom clamping plate, whose piston rods run through the corresponding clamping plate and are connected with the opposite clamping plate.

BRIEF DESCRIPTION OF THE DRAWINGS

Preferred embodiments of this invention will be described in more detail below with reference to the enclosed drawings, in which:

FIG. 1 is a top plan view of a gripper device according to the invention placed in a position above a sheet-metal part in which a top clamping plate is treated as transparent;

FIG. 2 is a view in the direction of arrow A in FIG. 1;

DETAILED DESCRIPTION

Figure 3:
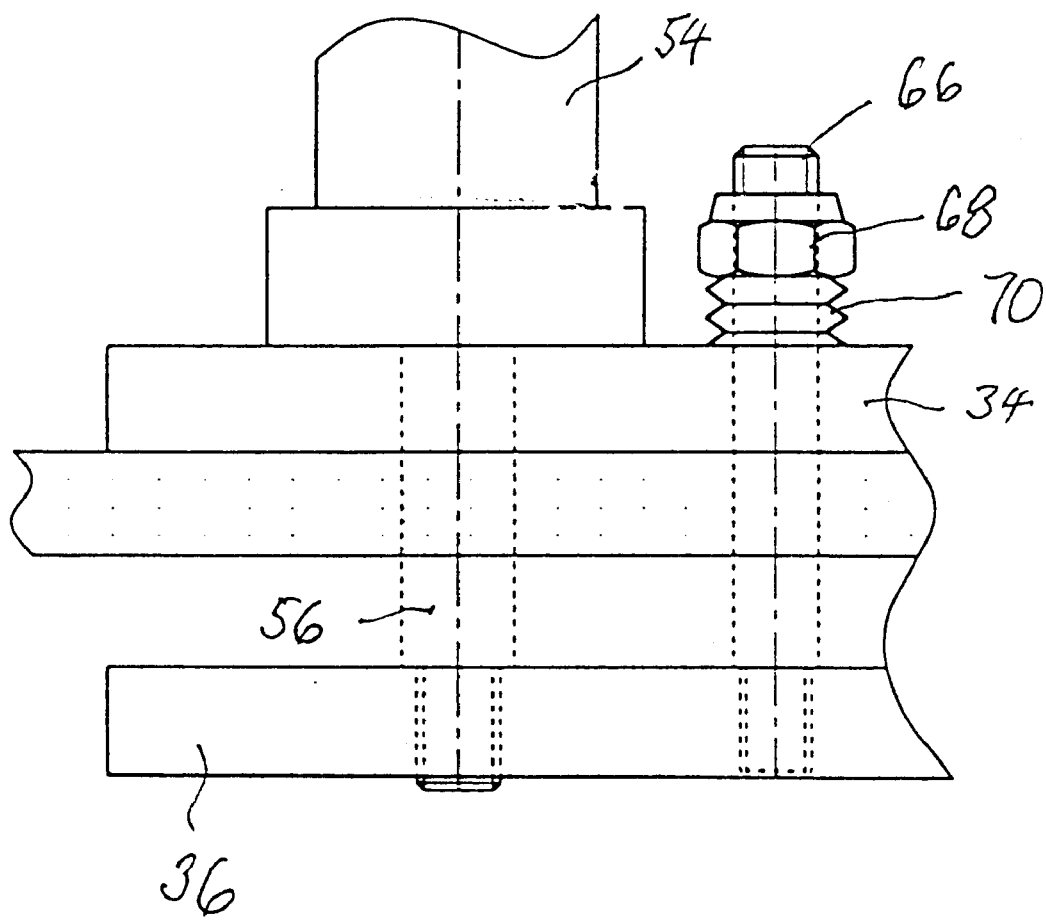
FIG. 3 shows a detail within circle Z in FIG. 2.

An overall gripper device according to the invention as in FIG. 1 is designated as 10. Gripper device 10 is shown above a sheet-metal part 12, which has a circular middle portion 14 inside which suction caps cannot grip for a variety of reasons, e.g. because this middle portion is uneven or stamped out. Suction cups can therefore only be used in the outer edge strip 16.

The gripper device of the invention has four arms disposed as a cross in relation to each other, said arms taking the form of gear racks 18,20,22,24, whose outer ends are fitted with suction cups 26,28,30,32, and whose inner ends lie between two congruent clamping plates 34,36 positioned with a gap in-between each other (FIG. 2). In FIG. 1 the top clamping plate 34 is treated as transparent, so that the gear racks 18,20,22,24 which are run between the clamping plates inside longitudinal guides 38,40,42,44 are visible.

In the centre of clamping plates 34,36 there is a toothed gear 46 which is rotatably mounted in a vertical axis. The inner ends of gear racks 18,20,22,24 engage with this toothed gear 46 in pairs on diametrically opposed sides. This means that the gear racks running in each one of the two directions of the cross-shaped arrangement are offset in parallel by the width, resp. the diameter, of the toothed gear, as shown in FIG. 1. Each pair of gear racks lies on a separate plane in relation to height. With regard to the horizontal plane, the pairs of gear racks are positioned essentially vertically in relation to each other.

As gear racks 18,20,22,24 cross each other in the vicinity of toothed gear 46, the parallel gear racks 18,22 on the one hand, and 20,24 on the other hand, lie between clamping plates 34,36 on superimposed planes.

On the top clamping plate 34 there are vertical air cylinders 48,50,52,54 disposed at equal angular distances along the edge strip of the two clamping plates. The piston rods 56,58 of the air cylinders run through top clamping plate 34 and their bottom ends are screwed into bottom clamping plate 36 by means of a threaded section. In this manner air cylinders 48,50,52,54 are able to draw clamping plates 34,36 together or press them apart.

Four guide bolts 60,62,64,66 are provided to ensure stability during this clamping and unclamping movement. Like piston rods 56,58, they also run through the top clamping plate 34, and they also have a bottom threaded portion (not designated), which is screwed into the bottom clamping plate 36. Guide bolts 60,62,64,66 project upwards beyond the top clamping plate. A nut 68 is provided on the top section which projects beyond clamping plate 34. Between the nut and the top clamping plate 34 there is a set of disc springs 70. Guide bolts 60,62,64,66 serve exclusively for ensuring the vertical guidance of the top clamping plate 34 in relation to the bottom clamping plate 36, whilst the position of the top clamping plate 34 in relation to the bottom clamping plate 36 is determined by air cylinders 48,50,52,54. The top section of the guide bolts therefore runs through the top clamping plate 34 in a drilled hole (not shown) with a relatively accurate fit. The disc spring set 70 ensures that clamping plates 34,36 are normally clamped together. In this case it is only necessary to supply the air cylinders with compressed air when the clamping plates have to be separated.

On top of top clamping plate 34 there is a radially displaceable control rod 72. This control rod 72 is run essentially radially inside a guide element 74 on top of clamping plate 34. This control rod 72 is also contrived as a gear rack. It engages with a section of toothed gear 46 lying above the top clamping plate, as shown in FIG. 1. When control rod 72 is displaced radially, the whole toothed gear 46 rotates so that gear racks 18,20,22,24 are either extended or retracted, depending on the direction of rotation. The control rod therefore serves to adjust the radial position of the suction cups 26,28,30,32.

At the outer end of control rod 72 an eyelet 76 is shown by way of example. As mentioned, the gripper device of the invention is intended to be used in conjunction with a robot which detects the gripper device in some appropriate way.

When the positions of suction cups 26,28,30,32 have to be altered because of a changeover in the product to be transported, the robot, which is not shown, drives the gripper device with the eyelet 76 to a fixed position for engagement, e.g. to a projecting pin. During the subsequent horizontal movement of the gripper device, control rod 72 moves relative to the gripper device so that gear racks 18,20,22,24 can be adjusted radially. As the robot is fitted with a control device anyway, which allows very accurate movement in all directions, including the horizontal direction, it is not necessary to provide precision positioning motors for gear racks 18,20,22,24 for the purpose of radially adjusting suction caps 26,28,30,32.

The given capacity of the robot and, in particular, its ability to execute precise horizontal movements, are therefore used for the purpose of adjusting the suction cups. On the other hand, the weight of the overall gripper device is only increased by the weight of the control rod, which can be made in a relatively light design, because the forces to be overcome are not big. There is no need for one or several drive motors with corresponding gears. Neither is it necessary to provide electric or pneumatic connections for the adjustment mechanism, which would then have to accompany the movements of the gripper mechanism. The solution according to the invention therefore represents a considerable simplification, thereby allowing corresponding cost savings.

What is claimed is:

1. A gripper device for thin, plate-like parts, comprising:
    a carrier frame,
    a plurality of suction cups disposed on an underside of the carrier frame,
    four gear racks disposed in a cross shape and adapted to be displaced longitudinally along two superimposed planes, said suction cups being fixed to outer ends of said four gear racks,
    a toothed gear mounted in a center of the cross shape formed by the racks, along a vertical axis, and extending over both superimposed planes, and the gear racks engaged with the toothed gear in pairs from diametrically opposed sides, and
    a control rod with a gear rack profile which engages with the toothed gear on a third plane, said control rod having an engaging device at one radially external end.

2. The gripper device of claim 1, wherein the four gear racks are disposed between a top and a bottom clamping plate.

3. The gripper device of claim 2, further comprising an arrangement for clamping the clamping plates together to fix the gear racks in position.

4. The gripper device of claim 3, further comprising longitudinal guides for the gear racks between the clamping plates.

5. The gripper device of claim 3, further comprising air cylinders on top of the top clamping plate, the air cylinders having piston rods which run through one clamping plate and are rigidly connected with the other clamping plate.

6. The gripper device of claim 3, further comprising air cylinders underneath the bottom clamping plate, the air cylinders having piston rods which run through one clamping plate and are rigidly connected with the other clamping plate.

7. The gripper device of claim 3, further comprising guide bolts which are screwed rigidly into one of the clamping plates and run through the other clamping plate via a guiding hole.

8. The gripper device of claim 2, further comprising longitudinal guides for the gear racks between the clamping plates.

9. The gripper device of claim 8, further comprising air cylinders on top of the top clamping plate, the air cylinders having piston rods which run through one clamping plate and are rigidly connected with the other clamping plate.

10. The gripper device of claim 8, further comprising air cylinders underneath the bottom clamping plate, the air cylinders having piston rods which run through one clamping plate and are rigidly connected with the other clamping plate.

11. The gripper device of claim 8, further comprising guide bolts which are screwed rigidly into one of the clamping plates and run through the other clamping plate via a guiding hole.

12. The gripper device of claim 2, further comprising air cylinders on top of the top clamping plate, the air cylinders having piston rods which run through one clamping plate and are rigidly connected with the other clamping plate.

13. The gripper device of claim 12, further comprising guide bolts which are screwed rigidly into one of the clamping plates and run through the other clamping plate via a guiding hole.

14. The gripper device of claim 2, further comprising guide bolts which are screwed rigidly into one of the clamping plates and run through the other clamping plate via a guiding hole.

15. The gripper device of claim 2, further comprising air cylinders underneath the bottom clamping plate, the air cylinders having piston rods which run through one clamping plate and are rigidly connected with the other clamping plate.

* * * * *